United States Patent [19]

Durrenberger et al.

[11] Patent Number: 5,096,528
[45] Date of Patent: Mar. 17, 1992

[54] METHOD OF FORMING CHAMFERED SPIGOT END ON PIPE

[75] Inventors: Fred H. Durrenberger, Norman; Thomas W. Hawkins, Oklahoma City; William W. Howze, Moore, all of Okla.

[73] Assignee: The Lamson & Sessions Co., Cleveland, Ohio

[21] Appl. No.: 301,795

[22] Filed: Jan. 25, 1989

[51] Int. Cl.⁵ .................. B31F 1/00; B29C 37/02; F16L 9/18
[52] U.S. Cl. .................. 156/211; 156/278; 156/309.9; 156/292; 156/322; 264/138; 138/109; 138/115; 285/138; 285/423
[58] Field of Search ............ 285/423, 138, 332, 334.5, 285/288, 237; 138/129, 148, 109, 115; 139/129; 156/197, 292, 304.5, 211, 278, 322, 309.9; 264/138, 152

[56] References Cited

U.S. PATENT DOCUMENTS 4,390,383  6/1983  van Dongeren .............. 285/133.1 X Primary Examiner—David A. Simmons
Assistant Examiner—Chester T. Barry
Attorney, Agent, or Firm—Fay, Sharpe, Beall, Fagan, Minnich & McKee

[57] ABSTRACT

A method of forming a chamfered and sealed end on a spiral wound plastic pipe of the type including at least a pair of radially spaced circumferential side walls connected by an intermediate wall which joins generally radially between the side walls and extends in a helical path axially of the pipe. The method includes determining the desired axial length of the chamfer and removing the intermediate wall which lies between the side walls axially inwardly of the end of the pipe a distance substantially equal to the desired length to define an outwardly open channel between the side walls. Thereafter one of the side walls is permanently deflected to bring it substantially into engagement with the end of the other of the side walls circumferentially about the pipe to thereby form a chamfer on the end of the pipe.

12 Claims, 3 Drawing Sheets 5,096,528

METHOD OF FORMING CHAMFERED SPIGOT END ON PIPE

BACKGROUND OF THE INVENTION

The subject invention is directed toward the art of pipes and tubular conduits and, more particularly, to a method of forming a chamfered end on a pipe.

The invention is especially suited for forming a chamfered spigot end on large diameter spiral wound plastic pipe and will be described with reference thereto; however, as will become apparent, the invention is capable of broader application and could be used on many types of pipe and for forming either bell or spigot ends.

In U.S. Pat. No. 3,926,223, there is illustrated a pipe construction which is particularly suited for forming large diameter pipe suitable for use as water or sewage pipe. The construction consists of a multiplicity of helical turns of an extruded thermoplastic synthetic resin strip having a cross-section with a hollow, generally rectangular form. The strip is extruded and coiled in a helical path. Adjacent turns of the helix are butt-welded to produce a continuous spiral wound pipe structure. The resulting pipe structure effectively constitutes a pair of radially spaced inner and outer side walls joined by a radially extending helical intermediate wall which forms a continuous helical chamber extending the length of the pipe. The method and apparatus used in constructing the pipe is more particularly shown and described in U.S. Pat. Nos. 3,917,500 and 4,033,808.

In the U.S. and most western countries the accepted method of connecting large diameter sewer and water pipe is through the use of rubber gasketed, bell and spigot pipe end construction. In order to produce a tapered or chamfered spigot end on the pipe, it has been the practice to simply machine a chamfer on the spigot end thereby exposing the helical inner wall. The exposed inner wall and the exposed portion of the helical chamber were then filled with a rigid, two part acrylic system.

The prior method produces an acceptable chamfered spigot end but it is both time consuming and expensive. In addition, the rigid acrylic filler reduces the flexibility of the pipe ends and makes them susceptible to breakage during handling and installation. As can be seen from the foregoing, a need exists for a more satisfactory method of forming and sealing the ends on spiral wound pipe.

BRIEF SUMMARY OF THE INVENTION

The subject invention provides a method which overcomes the noted problems and allows the necessary ends to be produced inexpensively and efficiently. More particularly, the subject invention provides a method of forming a sealed, chamfered end on a plastic pipe of the type comprising a pair of inner and outer radially spaced and circumferentially extending side walls joined by intermediate wall portions which extend radially between the side walls. The method includes the steps of determining a desired axial length for the chamfered end to be formed. Thereafter, a substantial portion of the intermediate wall which lie between the side walls axially inward of the outer end of the pipe is removed for a distance substantially equal to the desired length of the chamfer and circumferentially of the pipe to define a circumferentially continuous, axially outward open channel between the side walls. After the intermediate wall portions are removed, the outer end of at least one of the side walls is deflected to a position wherein it substantially engages the other side wall and closes the outwardly open channel. The at least one side wall is maintained in the deflected position and the outer ends of the side walls are then joined. As can be appreciated, the resulting structure has a continuously chamfered end about the circumference of the pipe and relies on the inner and outer walls of the pipe to provide smooth and continuous outer surfaces on the chamfered portion.

In accordance with a more limited aspect of the invention, the outer axial end of the radially outer side wall is deflected radially inwardly to produce an external chamfer on the pipe end.

In accordance with a further and more limited aspect of the invention, the method preferably includes the step of applying a sealant to the axial inner end of the open channel prior to the deflecting step. This sealant is applied at locations as necessary to seal any entrances from the inner end of the channel into the continuous spiral channel which is present in the pipe. By sealing this channel, the possibility of unwanted flow through the wall channel is reduced.

In accordance with a still further aspect of the invention, the outer ends of the side walls are joined by applying an adhesive bonding agent thereto completely about the outer end of the walls so that a continuous bond results about the end of the pipe.

It should be appreciated that in practicing the method, the exact shape of the chamfer can be varied as required. Further, for example, when the pipe is formed from a thermoplastic resin, heating the walls facilitates their deflection to the desired shape.

As is apparent from the foregoing, the primary object of the invention is the provision of a method of making a chamfered end on spiral wound pipe in a manner which allows the pipe to maintain its integrity and seal the passageway or channel between the inner and outer side walls of the pipe.

A further object of the invention is the provision of a method of the type described which allows the outer surfaces of the chamfered end to be formed by the inner and outer wall surfaces of the pipe.

Still another object of the invention is the provision of a method of the type discussed in which the inherent flexibility of the pipe is not reduced and the material of the tapered ends is integral with the material of the main body of the pipe.

A further and more limited object of the invention is the provision of a method which can be used to form bell and spigot ends on spiral wound plastic sewer pipe.

BRIEF DESCRIPTION OF THE DRAWINGS

The above and other objects and advantages will become apparent from the following description when read in conjunction with the accompanying drawings wherein.

DETAILED DESCRIPTION OF THE PREFERRED EMBODIMENTS

Figure 1:
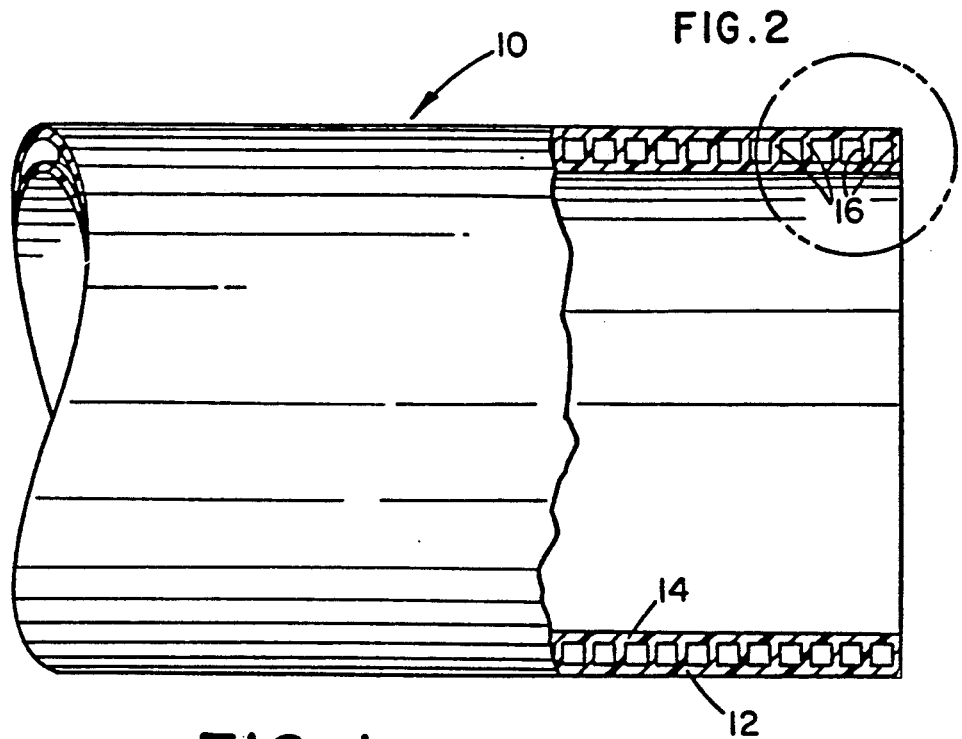
FIG. 1 is a side elevational view of a large diameter spiral wound plastic pipe to which the method of the invention is applicable (portions of the FIG. 1 showing are in section to more clearly illustrate the internal constructional details of the pipe)
Figure 2:
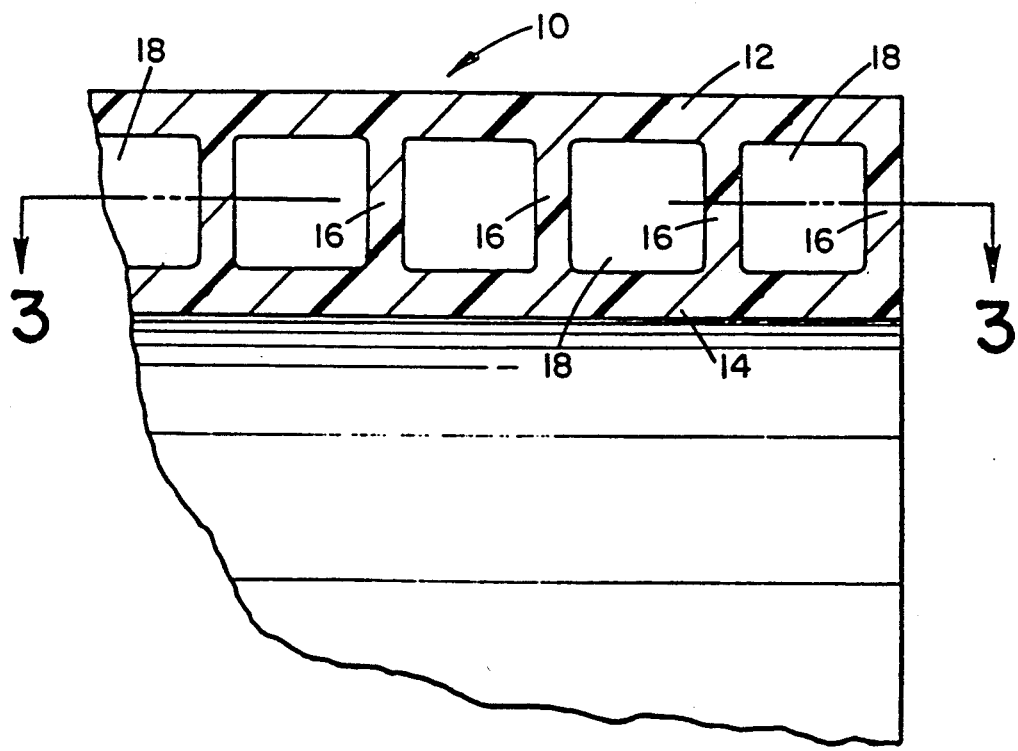
FIG. 2 is a greatly enlarged view of the circled area of FIG. 1.
Figure 3:
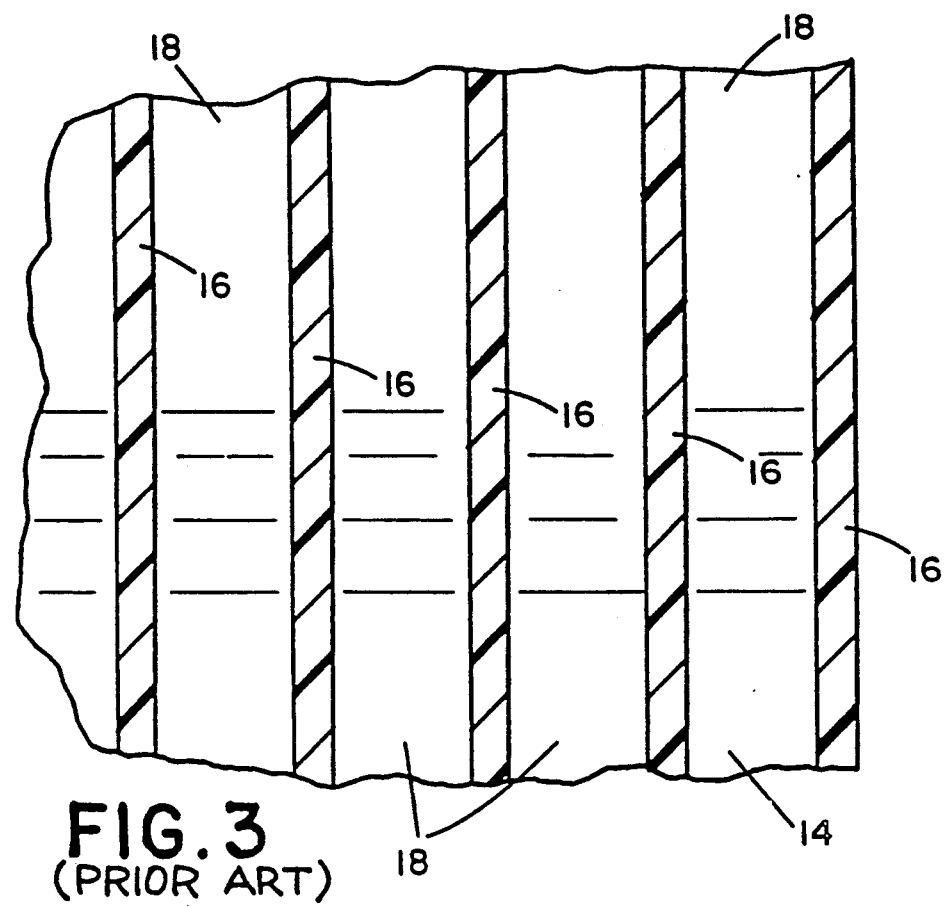
FIG. 3 is a partial cross-sectional view taken on line 3—3 of FIG. 2.

Referring more particularly to the drawings wherein the showings are for the purpose of illustrating a preferred embodiment of the invention only, FIGS. 1 through 3 best illustrate the pipe to which the invention is especially applicable. More specifically, the drawings show an end portion of large diameter pipe formed from a thermoplastic synthetic resin by extruding a hollow-profile strip which is helically coiled so that adjacent turns of the helix are butt-welded together at least in part by the extrusion heat. Pipe of this general type is illustrated and more fully described in U.S. Pat. No. 3,926,223 issued Dec. 16, 1975 and entitled "Large Diameter Hollow Bodies of Helical Thermoplastic Strip". As illustrated, the pipe 10 has a cylindrical configuration and comprises an outer cylindrical wall 12 which is spaced radially outward of an inner cylindrical wall 14. Walls 12 and 14 are joined by radially extending intermediate walls 16. Depending on the width of the extruded strip and the number of individual open cells within the extruded strip, the intermediate walls 16 and the resulting pipe can be constituted by a single helically wound wall or multiple walls lying in parallel helical paths. In any event, the structure results in the provision of one or more helical chambers 18 which are continuous throughout the length of the pipe. Like the walls 16, the chambers 18 can be constituted of a single chamber or several parallel chambers depending upon the number of individual cells in the extruded strip.

In the embodiment illustrated, a single celled strip is extruded and, as a consequence, there is a single continuous spiraled intermediate wall 16 and a single continuous spiraled intermediate chamber 18 extending end to end within the pipe 10.

Figure 4:
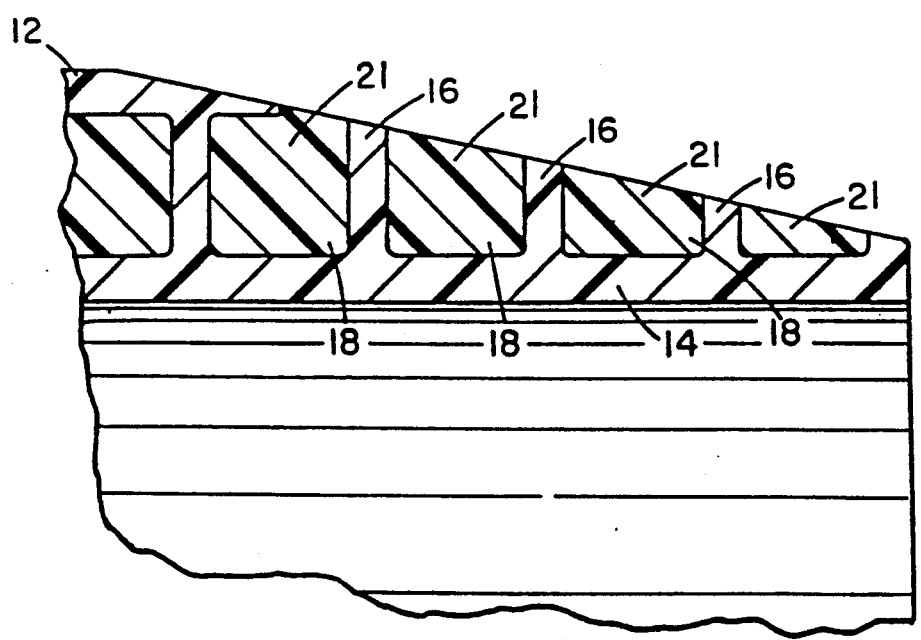
FIG. 4 is a view similar to FIG. 2 but showing a chamfered spigot end formed in accordance with a prior art method.

FIGS. 1 through 3 illustrate the pipe in its "as formed" condition with the right hand end (as viewed in FIG. 1) cut square to sever the extruded and spiraled pipe into desired lengths. It is, of course, necessary to provide a chamfered spigot end on the pipe if the pipe is to be joined by the standard and well known gasket and bell and spigot type connection. FIG. 4 illustrates the prior art method used for forming a chamfered spigot on pipe of the type illustrated in FIGS. 1 through 3. As illustrated therein, a continuous chamfer was formed on the end of the pipe by cutting or machining a continuous taper about the outer circumference of the end to remove a predetermined axial length of wall 12 and to cut the adjacent intermediate wall 16 in the manner shown in FIG. 4. To provide a smooth outer surface and to seal the circumferentially extending interior chamber or passage 18, a suitable filler material such as a two part mixture of an acrylic material 20 was trowelled or otherwise applied into the exposed chambers 18 as shown in FIG. 4. After the acrylic material hardened, the resulting end of the pipe was in a suitably tapered configuration to function as a sealed spigot end. This method was, however, both time consuming and somewhat expensive since it required the application of a relatively large amount of acrylic filler. In addition, the method resulted in a weight increase for the pipe and increased the rigidity of the end of the pipe. Moreover, the filler material had a tendency to make the pipe end susceptible to breakage during handling and installation.

Figure 5:
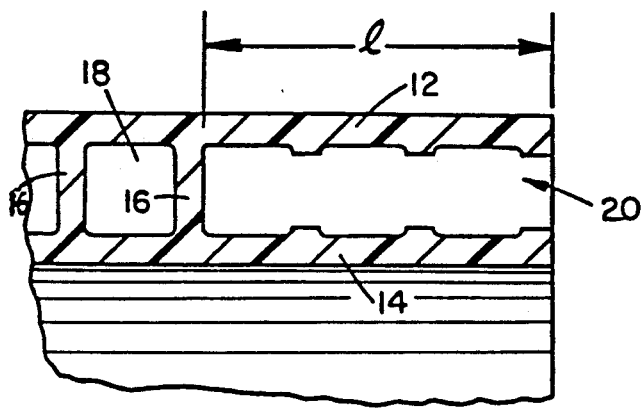
FIGS. 5 through 8 are cross-sectional views similar to FIG. 2 but showing the sequence of method steps used in practicing the preferred embodiment of the invention to produce a chamfered spigot end.
Figure 6:
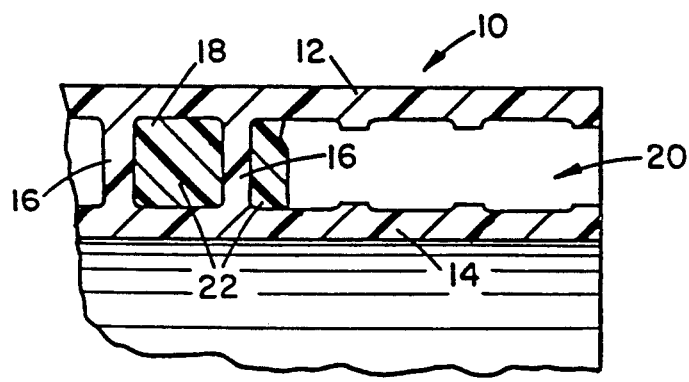

As mentioned previously, the subject method overcomes the problems with the prior art and facilitates the production of the required chamfered and sealed end. In this regard, FIGS. 5 through 8 best illustrate the preferred sequence of steps used in forming a chamfered and sealed end in accordance with the subject invention. As shown in FIG. 5, formation of the chamfered end begins by determining a desired length of chamfer, for example, length L as illustrated in FIG. 5. Thereafter, a substantial amount of the connecting side walls 16 and any other material which may be present therein is removed from between spaced inner and other side walls 12, 14. In the subject embodiment, substantially all of the intermediate wall material 16 is removed through use of an end mill progressed circumferentially about the end of the pipe. This results in an outwardly open channel 20. As will subsequently become apparent, the shape and amount of the intermediate wall material which is removed can be varied depending upon the shape of the resulting chamfered desired and practical considerations such as the ease of removal. For example, as is apparent, rather than having a U-shape the channel 20 could be V-shaped.

After the channel 20 has been formed, sealant material 22 is preferably applied to the inner end of the channel 20 to seal any entries to the helical path 18. Referring to FIG. 3 it can be seen that depending upon the number of channels in the extruded strip which forms the pipe, one or more independent helical channels 18 may open into the bottom of the channel 20. It is to be understood that it is preferable if all such openings into the bottom of channel 20 be sealed, for example, by a mastic type sealant or even a two part acrylic type filler. In fact, whatever type of sealant will act to prevent fluid entry into the channels and stop unwanted flow through the spiral or helical paths is suitable.

Figure 7:
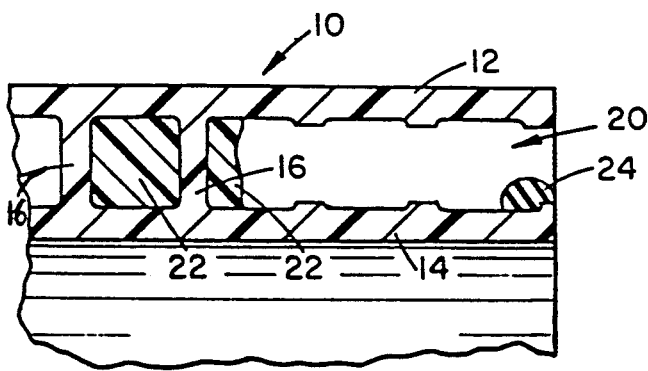
Figure 8:
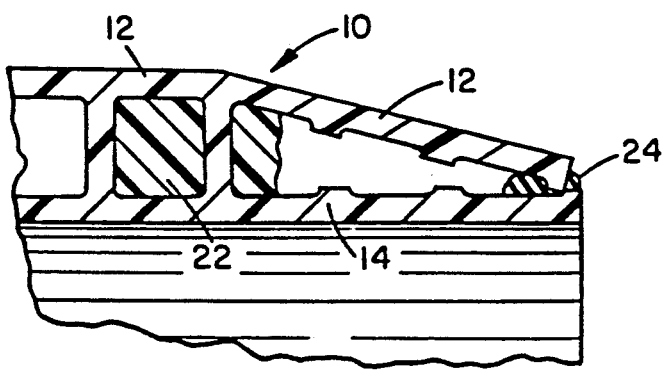

Continuing with the practice of the method, FIG. 7 shows the next step in the formation of the chamfered end. In particular, as illustrated in FIG. 7, after the sealant 22 has been applied to seal the ends of the helical passages 18, a bead of adhesive 24 is applied circumferentially about the entrance of the channel 20. Thereafter, the end portion of the outer wall 12 is heated at least in the area where it is desired to bend the wall. More particularly, if a simple tapered chamfer is desired about the outer circumference of the pipe end, the outer length L (see FIG. 5) is preferably heated sufficiently to render the wall plastic and deformable. Subsequently, the outer end portion of wall 12 can be readily deflected inwardly as shown in FIG. 8 to bring the outermost end of the wall 12 into engagement with the adhesive 24. The combination of the adhesive 24 plus cooling of the wall 12 assures that the deflected wall section will remain in the position shown in FIG. 8. As can be seen from FIG. 8, the resulting structure has the desired chamfered spigot end configuration but without the problems and disadvantages resulting from the prior method illustrated in FIG. 4.

In practicing the method of the subject invention, it should be appreciated that the length of the chamfer could be readily varied merely by removing a greater or lesser axial length of the intermediate walls 16. Additionally, it should be appreciated that the chamfer could take various shapes and, for example, both the inner wall 14, as well as the outer wall 12 could be deflected to vary the shape of the chamfered end. In addition, although the method has been described with reference to its use on the spigot end of the pipe, it is equally applicable to the bell end.

The invention has been described with reference to a preferred embodiment. Obviously, modifications and alterations will occur to others upon the reading and understanding of this specification. It is intended to include all such modifications and alterations insofar as they come within the scope of the appended claims or the equivalents thereof.

What is claimed is:

1. A method of forming a chamfered end on a spirally wound plastic pipe of the type including at least a pair of radially spaced circumferential side walls connected by at least one intermediate wall which joins generally radially between said side walls and extends in a helical path axially of said pipe to define a helical chamber between said side walls, said method comprising the steps of:
   a) determining the desired axial length of said chamfered end and removing a substantial portion of any of said intermediate wall which lies between said side walls axially inwardly of the end of said pipe a distance substantially equal to said desired length and circumferentially of said pipe to define an axial outwardly open channel between said side walls and,
   b) permanently deflecting the end of at least one of said side walls to bring it substantially into engagement with the end of the other of said side walls circumferentially about said pipe to thereby form a chamfer on the end of said pipe.

2. The method as defined in claim 1 including the step of bonding the ends of said side walls subsequent to said deflecting step.

3. The method as defined in claim 1 including the step of sealing any openings to said helical chamber prior to said deflecting step.

4. The method as defined in claim 1 wherein the end of the radially outer of said side walls is permanently deflected radially inward to form an exterior chamfer on the end of sad pipe.

5. The method as defined in claim 1 wherein a sealant is inserted between the axial outer ends of said side walls.

6. The method as defined in claim 1 comprising removing substantially all of the intermediate wall lying between said side walls axially inward of the end of said pipe for a distance substantially equal to said desired length and circumferentially of said pipe.

7. A method of forming a chamfered end on a plastic pipe of the type comprising a pair of inner and outer radially spaced circumferentially extending side walls and an intermediate wall portion extending radially between said side walls, said method comprising the steps of:
   a) determining a desired axial length for said chamfered end and removing a substantial portion of said intermediate wall which lies between said side walls axially inwardly of the end of said pipe for a distance substantially equal to said desired length and circumferentially of sad pipe to define an axially outward open channel between said side walls,
   b) deflecting the end of at least one of said side walls to a position wherein it substantially engages said other side wall and closes sad outwardly open channel; and,
   c) maintaining said at least one of said side walls in said deflected position and joining the outer ends of said side walls.

8. The method as defined in claim 7 wherein the end of said outer side wall is deflected radially inwardly.

9. The method as defined in claim 7 wherein a sealant is applied to the axial inner end of said channel prior to said deflecting step.

10. The method as defined in claim 7 wherein said pipe is formed from a thermoplastic and including the steps of heating the end of said pipe until said at least one side wall becomes soft and pliable prior to the step of deflecting.

11. The method of claim 10 wherein said outer ends of said side walls are joined by applying an adhesive bonding agent thereto.

12. The method of claim 11 wherein said pipe is a spirally wound pipe and said intermediate wall extends in a spiral path axially of said pipe to define a helical chamber between said side walls, said method including the additional step of sealing any openings to said helical chamber prior to said deflecting step.

* * * * *